US006471391B1

(12) United States Patent
Opitz

(10) Patent No.: US 6,471,391 B1
(45) Date of Patent: Oct. 29, 2002

(54) DRINK STIRRING DEVICE

(76) Inventor: Francisco Opitz, Caracas 1050 A-51089 Bulevar Sabana Grande Ed. Mimi Piso 5 of 16, Caracas D.F. (VE)

( * ) Notice: Subject to any disclaimer, the term of this patent is extended or adjusted under 35 U.S.C. 154(b) by 8 days.

(21) Appl. No.: 09/616,917

(22) Filed: Jul. 14, 2000

(51) Int. Cl.[7] .................................................. B01F 7/16
(52) U.S. Cl. ....................... 366/129; 366/343; D7/300.2
(58) Field of Search ................. 366/129, 120, 366/142, 241, 279, 343; D7/300.2; 416/70 R, 71; 200/60; 362/200, 202, 204, 205, 206, 208; 239/33

(56) References Cited

U.S. PATENT DOCUMENTS

| | | | | |
|---|---|---|---|---|
| D149,499 S | * | 5/1948 | Holden | |
| 2,717,463 A | * | 9/1955 | Sindler | |
| 2,723,111 A | * | 11/1955 | Lawrence | |
| 2,793,842 A | * | 5/1957 | Bacon | |
| D211,046 S | * | 5/1968 | Saffran | D7/300.2 |
| 3,592,199 A | * | 7/1971 | Ostensen | |
| 3,644,725 A | * | 2/1972 | Lochridge, Jr. | |
| 3,737,655 A | * | 6/1973 | Blendinger et al. | |
| 3,772,809 A | * | 11/1973 | Schneller | |
| 4,302,797 A | * | 11/1981 | Cooper | 362/119 |
| 4,483,622 A | * | 11/1984 | Muhi et al. | 366/129 |
| D291,956 S | * | 9/1987 | Fenner | |
| D301,104 S | * | 5/1989 | Hammerquist | |
| 4,854,712 A | * | 8/1989 | Mori | 366/129 |
| 4,924,358 A | * | 5/1990 | Von Heck | 362/202 |
| D314,880 S | * | 2/1991 | Rentsch | D7/300.2 |
| 5,151,720 A | * | 9/1992 | Kanbar | D7/300.2 |
| 5,337,735 A | | 8/1994 | Salerno | |
| D371,269 S | | 7/1996 | Shattuck et al. | |
| 5,628,556 A | | 5/1997 | Hrabar et al. | |
| D389,364 S | | 1/1998 | Vallarella et al. | |
| 5,713,664 A | * | 2/1998 | Harilela | 366/129 |
| 5,865,524 A | * | 2/1999 | Campman | 363/205 |
| 6,129,473 A | * | 10/2000 | Shu | 362/118 |
| 6,135,606 A | * | 10/2000 | Fernandex et al. | 362/253 |
| 6,231,204 B1 | * | 5/2001 | Lo | 362/206 |
| 6,305,832 B1 | * | 10/2001 | Huang | 366/129 |

* cited by examiner

Primary Examiner—Tony G. Soohoo

(57) ABSTRACT

A drink stirring device for providing a decorative and entertaining conversation piece. The drink stirring device includes a swizzle stick member being essentially hollow and having an upper portion and an elongate lower portion; and also includes a light-emitting member securely and removably disposed within the swizzle stick member; and further includes a power source assembly for energizing the light-emitting member.

8 Claims, 1 Drawing Sheet

DRINK STIRRING DEVICE

BACKGROUND OF THE INVENTION

1. Field of the Invention

The present invention relates to a lighted swizzle stick and more particularly pertains to a new drink stirring device for providing a decorative and entertaining conversation piece.

2. Description of the Prior Art

The use of a lighted swizzle stick is known in the prior art. More specifically, a lighted swizzle stick heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,854,712; 5,337,735; 5,628,556; Des. 389,364; 4,483,622; and Des. 371,269.

While these devices fulfill their respective, particular objectives and requirements, the aforementioned patents do not disclose a new drink stirring device. The inventive device includes a swizzle stick member being essentially hollow and having an upper portion and an elongate lower portion; and also includes a light-emitting member securely and removably disposed within the swizzle stick member; and further includes a power source assembly for energizing the light-emitting member.

In these respects, the drink stirring device according to the present invention substantially departs from the conventional concepts and designs of the prior art, and in so doing provides an apparatus primarily developed for the purpose of providing a decorative and entertaining conversation piece.

SUMMARY OF THE INVENTION

In view of the foregoing disadvantages inherent in the known types of lighted swizzle stick now present in the prior art, the present invention provides a new drink stirring device construction wherein the same can be utilized for providing a decorative and entertaining conversation piece.

The general purpose of the present invention, which will be described subsequently in greater detail, is to provide a new drink stirring device which has many of the advantages of the lighted swizzle stick mentioned heretofore and many novel features that result in a new drink stirring device which is not anticipated, rendered obvious, suggested, or even implied by any of the prior art lighted swizzle stick, either alone or in any combination thereof.

To attain this, the present invention generally comprises a swizzle stick member being essentially hollow and having an upper portion and an elongate lower portion; and also includes a light-emitting member securely and removably disposed within the swizzle stick member; and further includes a power source assembly for energizing the light-emitting member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drink stirring device which has many of the advantages of the lighted swizzle stick mentioned heretofore and many novel features that result in a new drink stirring device which is not anticipated, rendered obvious, suggested, or even implied by any of the prior art lighted swizzle stick, either alone or in any combination thereof.

It is another object of the present invention to provide a new drink stirring device which may be easily and efficiently manufactured and marketed.

It is a further object of the present invention to provide a new drink stirring device which is of a durable and reliable construction.

An even further object of the present invention is to provide a new drink stirring device which is susceptible of a low cost of manufacture with regard to both materials and labor, and which accordingly is then susceptible of low prices of sale to the consuming public, thereby making such drink stirring device economically available to the buying public.

Still yet another object of the present invention is to provide a new drink stirring device which provides in the apparatuses and methods of the prior art some of the advantages thereof, while simultaneously overcoming some of the disadvantages normally associated therewith.

Still another object of the present invention is to provide a new drink stirring device for providing a decorative and entertaining conversation piece.

Yet another object of the present invention is to provide a new drink stirring device which includes a swizzle stick member being essentially hollow and having an upper portion and an elongate lower portion; and also includes a light-emitting member securely and removably disposed within the swizzle stick member; and further includes a power source assembly for energizing the light-emitting member.

Still yet another object of the present invention is to provide a new drink stirring device that would brighten up a party or some other social function.

Even still another object of the present invention is to provide a new drink stirring device that would be an ideal gift.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
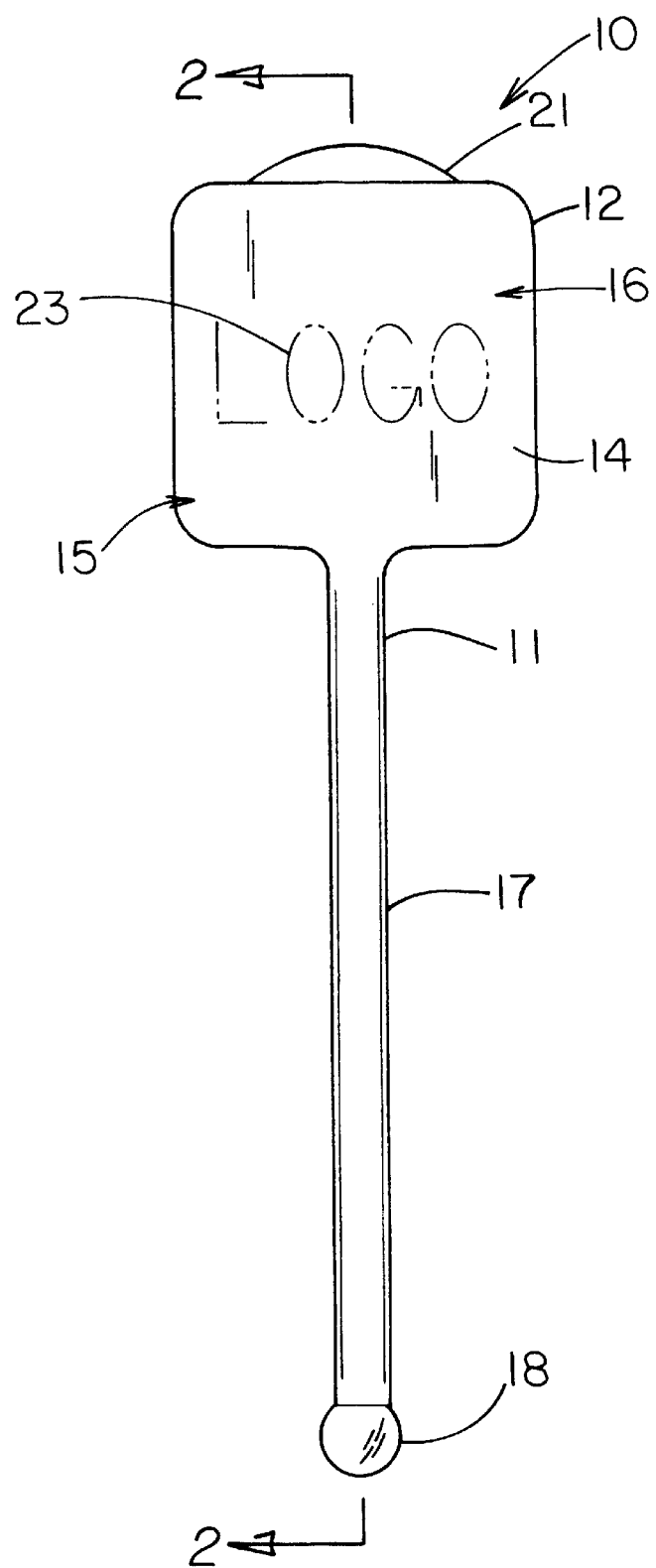
FIG. 1 is a front elevational view of a new drink stirring device according to the present invention.
Figure 2:
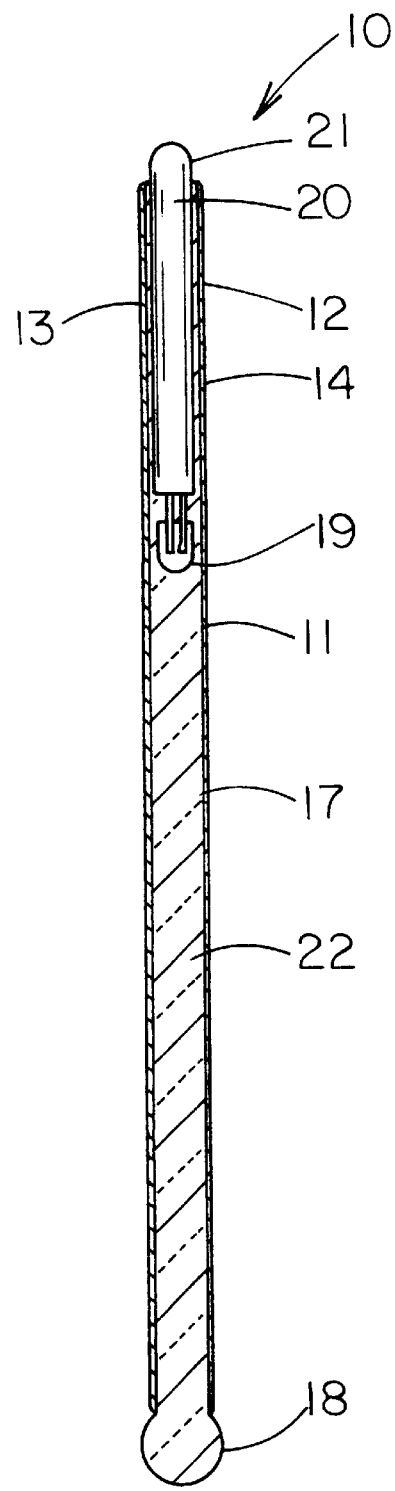
FIG. 2 is a cross-sectional view of the present invention.

With reference now to the drawings, and in particular to FIGS. 1 through 2 thereof, a new drink stirring device embodying the principles and concepts of the present invention and generally designated by the reference numeral 10 will be described.

As best illustrated in FIGS. 1 through 2, the drink stirring device 10 generally comprises a swizzle stick member 11 being essentially hollow and having an upper portion 12 and an elongate lower portion 17. The upper portion 12 of the swizzle stick member 11 is enlarged and includes two side walls 13, 14 which are adapted to have messages 23 and information conventionally displayed and imprinted thereupon. Each of the side walls 13, 14 has side portions 15, 16 which extend laterally and outwardly relative to the lower portion 17 with the elongate lower portion 17 of the swizzle stick member 11 being essentially made of fiber optics 22 for creating a lighting effect along a length of the lower portion 17. The swizzle stick member 11 includes a bulbous bottom end 18.

A light-emitting member 19 is securely, conventionally and removably disposed inside the swizzle stick member 11 with the light-emitting member 19 being generally disposed at a junction of the upper 12 and lower 17 portions. A power source means for energizing the light-emitting member 19 includes a battery 20 removably and conventionally disposed inside the upper portion 12 of the swizzle stick member 11 through a top end thereof, and also includes a switch 21 being conventionally disposed in the top end of the upper portion 12 of the swizzle stick member 11 and being conventionally connected to the light-emitting member 19 and to the battery 20 for energizing the light-emitting member 19.

In use, the user can turn on the light-emitting member 19 with the switch 21 thus lighting up the upper and lower portions 12, 17 of the swizzle stick member 11 and the messages 23 and information conventionally displayed upon the side walls 13, 14 of the upper portion 12 of the swizzle stick member 11 with the swizzle stick member 11 also being used to conveniently stir one's drink.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drink stirring device comprising:
   a swizzle stick member having an upper portion and an elongate lower portion;
   a light-emitting member disposed within said swizzle stick member; and
   a power means for powering said light-emitting member, said power means including a switch for selectively supplying power to said light-emitting member to thereby energize said light-emitting member, said switch protruding from the top end of said upper portion of said swizzle stick member in a direction away from said lower portion of said swizzle stick member.

2. A drink stirring device as described in claim 1, wherein said upper portion of said swizzle stick member is enlarged with respect to said elongate lower portion and includes at least one side wall for having information displayed thereupon.

3. A drink stirring device as described in claim 2, wherein said at least one side wall of said upper portion has side portions which extend laterally and outwardly relative to said lower portion.

4. A drink stirring device as described in claim 1, wherein said light-emitting member is disposed at a junction of said upper and lower portions.

5. A drink stirring device as described in claim 1, wherein said power means includes a battery removably disposed inside said upper portion of said swizzle stick member through a top end thereof, said switch being connected to said light-emitting member and to said battery for energizing said light-emitting member.

6. A drink stirring device as described in claim 5, wherein said elongate lower portion of said swizzle stick member comprises a fiber optic material for creating a lighting effect along a length of said lower portion.

7. A drink stirring device as described in claim 1, wherein said swizzle stick member includes a bulbous bottom end.

8. A drink stirring device comprising:

a swizzle stick member being essentially hollow and having an upper portion and an elongate lower portion, said upper portion of said swizzle stick member being enlarged and includes at least one side wall which is adapted to have messages and information displayed thereupon, said at least one side wall of said upper portion having side portions which extend laterally and outwardly relative to said lower portion, said elongate lower portion of said swizzle stick member being essentially made of fiber optics for creating a lighting effect along a length of said lower portion, said swizzle stick member including a bulbous bottom end;

a light-emitting member securely and removably disposed within said swizzle stick member, said light-emitting member being generally disposed at a junction of said upper lower portions; and a power means for powering said light-emitting member including a battery removably disposed inside said upper portion of said swizzle stick member through a top end thereof and also including a switch for selectively supplying power to said light-emitting member to thereby energize said light-emitting member, said switch protruding from the top end of said upper portion of said swizzle stick member in a direction away from said lower portion of said swizzle stick member, said switch being connected to said light-emitting member and to said battery for energizing said light-emitting member.

\* \* \* \* \*